US007862926B2

(12) United States Patent
Bourilkov et al.

(10) Patent No.: US 7,862,926 B2
(45) Date of Patent: Jan. 4, 2011

(54) FUEL CARTRIDGE INTERCONNECT FOR PORTABLE FUEL CELLS

(75) Inventors: Jordan T. Bourilkov, Stamford, CT (US); Andrew G. Gilicinski, Danville, CA (US); David N. Klein, Southbury, CT (US); John Rotondo, Trumbull, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 12/358,320

(22) Filed: Jan. 23, 2009

(65) Prior Publication Data

US 2009/0128088 A1 May 21, 2009

Related U.S. Application Data

(62) Division of application No. 10/616,495, filed on Jul. 9, 2003, now Pat. No. 7,482,091.

(51) Int. Cl.
*H01M 2/26* (2006.01)
*H01M 10/00* (2006.01)
*H01M 12/00* (2006.01)

(52) U.S. Cl. ............................ 429/121; 429/122; 429/9; 320/103

(58) Field of Classification Search ............... 429/9, 429/34, 23, 121, 122; 320/103, 138, 140
See application file for complete search history.

(56) References Cited

U.S. PATENT DOCUMENTS

| | | | |
|---|---|---|---|
| 5,309,082 A * | 5/1994 | Payne | 323/270 |
| 5,854,549 A | 12/1998 | Paulick | |
| 6,104,162 A | 8/2000 | Sainsbury et al. | |
| 6,141,569 A | 10/2000 | Weisshappel et al. | |
| 6,517,972 B1 * | 2/2003 | Amatucci | 429/231.1 |
| 6,590,370 B1 | 7/2003 | Leach | |

(Continued)

FOREIGN PATENT DOCUMENTS

EP 0 559 573 A1 9/1993

(Continued)

OTHER PUBLICATIONS

Han et al., "Direct Methanol Fuel-Cell Combined with a Small Back-Up Battery," J. Power Sources, 112,477-483 (2002).

(Continued)

*Primary Examiner*—Patrick Ryan
*Assistant Examiner*—Thomas H. Parsons
(74) *Attorney, Agent, or Firm*—Fish & Richardson P.C.

(57) ABSTRACT

A hybrid power supply includes a fuel cell and an interface between the fuel cell and a fuel cartridge or external battery and a switching type DC/DC boost type converter that receives energy from the fuel cell or external battery and is arranged to deliver the energy to a rechargeable cell. The hybrid power supply also includes a fuel cell current sensor/comparator, included in a feedback control loop disposed about the DC/DC converter, which controls in part operation of the converter to provide constant current discharge on the fuel battery side of the hybrid power supply. An adapter that couples a source of AC power such as a charger to the interconnect is also disclosed.

25 Claims, 11 Drawing Sheets

U.S. PATENT DOCUMENTS

| | | |
|---|---|---|
| 6,628,011 B2 * | 9/2003 | Droppo et al. ................ 307/43 |
| 6,926,989 B2 | 8/2005 | Xie et al. |
| 6,955,863 B2 | 10/2005 | Bean et al. |
| 2002/0018932 A1 | 2/2002 | Chikada |
| 2002/0150815 A1 | 10/2002 | Ehara |
| 2002/0175657 A1 | 11/2002 | Leboe |
| 2003/0105562 A1 | 6/2003 | Hsiao et al. |
| 2003/0155887 A1 | 8/2003 | Bourilkov et al. |
| 2004/0081884 A1 | 4/2004 | Bean et al. |
| 2004/0253500 A1 | 12/2004 | Bourilkov et al. |

FOREIGN PATENT DOCUMENTS

| | | |
|---|---|---|
| EP | 0 944 123 A1 | 9/1999 |
| EP | 1 032 108 A2 | 3/2000 |
| EP | 1 063 714 A2 | 12/2000 |
| EP | 1 225 082 A2 | 7/2002 |
| GB | 2 281 642 A | 3/1995 |
| WO | WO 98/32182 | 7/1999 |

OTHER PUBLICATIONS http://en.wikipedia.org/wiki/Primary_cell.
http://tpub.com/neets/book1/chapter2/1a.htm.

* cited by examiner

FUEL CARTRIDGE INTERCONNECT FOR PORTABLE FUEL CELLS

CROSS-REFERENCE TO RELATED APPLICATION

This application is a divisional (and claims the benefit of priority under 35 U.S.C. §121) of U.S. application Ser. No. 10/616,495, filed Jul. 9, 2003 (now U.S. Pat. No. 7,482,091). The disclosure of the prior application is considered part of (and is incorporated by reference in) the disclosure of this application.

BACKGROUND

This invention relates to powering of portable electronic devices.

Portable electronic devices are normally powered with either a primary or a rechargeable battery. Growth in the portable electronic device market, as well as, changes in usage patterns, has provided opportunities for rechargeable sources of power to power an electronic device. While primary batteries have a greater energy density, their internal resistance is larger, and primary batteries are less suitable in high drain (>0.2C rate of discharge) electronic devices. Rechargeable batteries can handle large loads but do not have sufficient energy capacity for many applications.

Fuel cells incorporated into power sources for portable devices promise longer runtimes than conventional battery systems, due to the ability to use high-energy content fuels. Several fuel cell technologies are currently under development for commercialization in portable power applications, namely direct methanol fuel cells (DMFC) and hydrogen PEM fuel cells (H2FC). Both require the ability to replenish fuel into the power source when it is used up.

SUMMARY

According to an aspect of the invention, an adapter includes a member including appropriate mating fittings to allow the member to connect to a interconnect that interfaces a battery or a source of fuel to a fuel cell system for powering an electronic device.

According to an aspect of the invention, an adapter includes a first member including appropriate mating fittings to allow the member to connect to a interconnect that interfaces a source of fuel to a fuel cell system, a second member having electronics to convert power incident at an input of the adapter to an output power level at the pair of spaced battery terminals of the member, a first pair of wires coupled between an input of the first member and output of the second member and a second pair of wires coupled from an input of the second member to an electronic plug.

According to an aspect of the invention, a hybrid power supply includes an interface between a fuel cell system and a fuel cartridge or battery and a switching type DC/DC boost type converter coupled to the interface and which receives energy from a fuel cell or from an external battery connected the interface, and which is arranged to deliver the energy to a rechargeable cell, the DC/DC converter configured to provide substantially constant current drain from the fuel cell.

According to an aspect of the invention, a hybrid power supply includes a fuel cell, an interface between the fuel cell and a fuel cartridge or external battery and a switching type DC/DC boost type converter that receives energy from the fuel cell or an external battery connected to the interface and is arranged to deliver the energy to a rechargeable cell. The hybrid power supply also includes a fuel cell current sensor/comparator, included in a feedback control loop disposed about the DC/DC converter, which controls in part operation of the converter to provide constant current discharge on the fuel battery side of the hybrid power supply.

According to an aspect of the invention, a hybrid power supply includes a fuel cell, an interconnect that can receive a fuel cartridge, a battery, or a power adapter, a rechargeable cell and a DC/DC boost type converter that receives energy from the fuel cell, battery or adapter, and is arranged to deliver the energy to the rechargeable cell.

Aspects of the invention provide convenient techniques for operating a fuel cell hybrid-powered device in situations where a fuel cartridge is temporarily unavailable. This is achieved by providing energy to a fuel cell hybrid system from a battery or battery cartridge that is interchangeable with the fuel cartridge cavity in the device. Either a fuel cartridge or a battery inserted into the cavity would allow the embedded rechargeable battery to be recharged and provide power to the device. Either the plug-in fuel cartridge or the battery cartridge can then be replaced after use. This technique allows for different voltages on batteries to be accommodated, and provides a highly flexible approach to provide energy to the fuel cell hybrid power source using any primary or charged secondary battery chemistry available that fits into the fuel cartridge cavity. The technique also allows a charger or other non-portable sources of electrical power to supply power to the device. For instance an adapter can be configured to allow a power port such as a cigarette lighter commonly found in automobiles to supply power to the device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
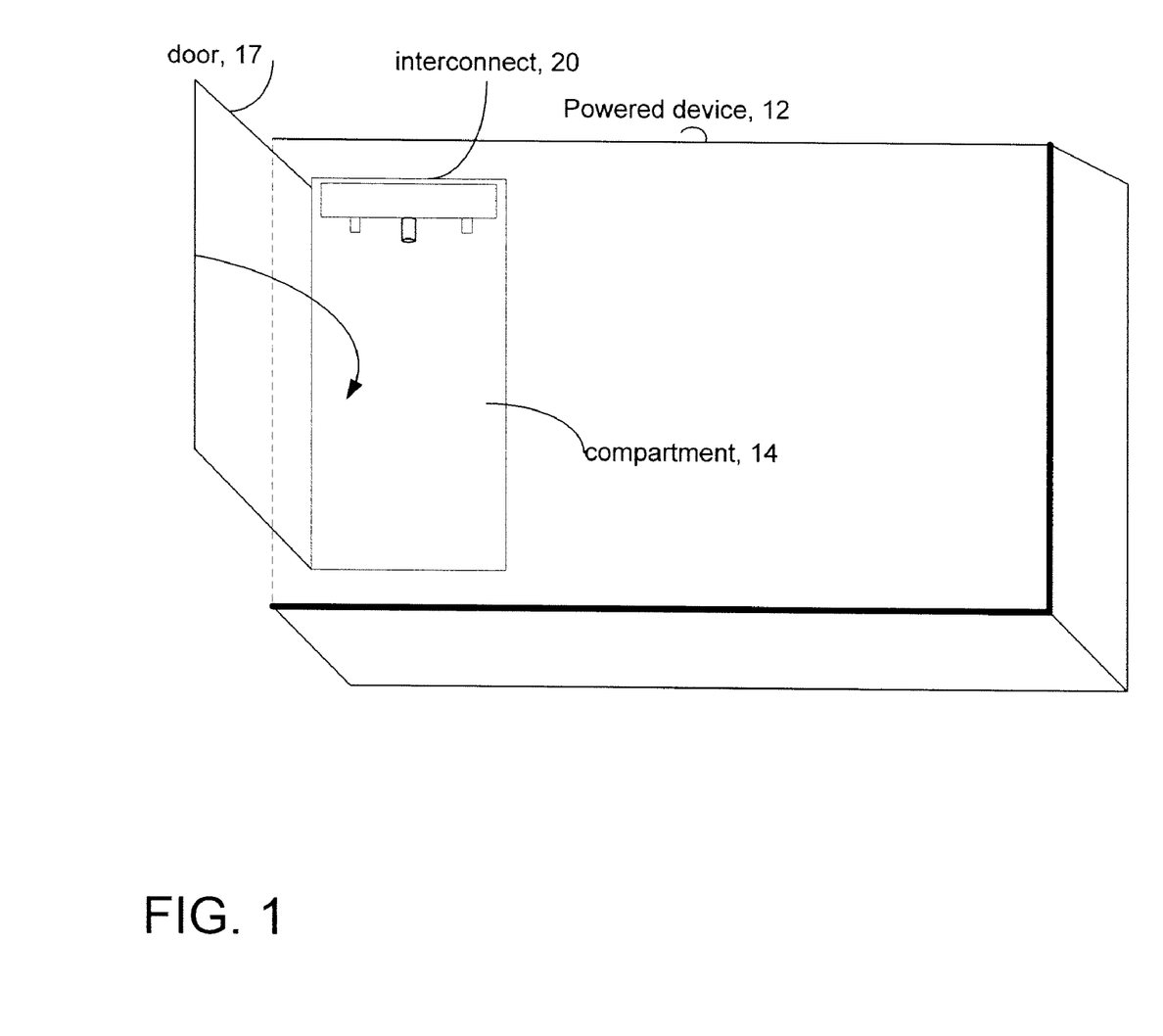
FIG. 1 is a block diagram.

Referring to FIG. 1, a portable powered, electronic device 12 (hereafter device 12) is shown. The device 12 includes a housing 11, having a compartment 14 to house an energy source (not shown) and a door 17 to enclose the compartment. The device 12 also includes an interconnect 20 disposed in the compartment 14 to interface either a battery source of power, e.g., primary or secondary, e.g., rechargeable batteries 16 or a fuel cartridge that supplies a source of fuel (a form of hydrogen) to a fuel cell (not shown). While the door 17 is shown pivoting along a side of the compartment that is perpendicular to the interconnect 20, in some embodiments it may be desirable to access the compartment from the side opposite the interconnect 20 to permit easy insertion of batteries and fuel cartridges.

The interconnect 20 can distinguish between a fuel cartridge and a battery. The interconnect 20 provides a convenient technique to allow a fuel cell-powered device to operate in situations where a fuel cartridge is temporarily unavailable. The interconnect 20 allows the power source to automatically detect the insertion of a primary or charged secondary battery or batteries into the fuel cartridge cavity. The interconnect 20 allows the primary or secondary battery or batteries to operate the device and allows consumers to use their device in the temporary absence of a fuel cartridge. Device 12 can be any type of portable device such as a mobile phone, portable computer or audio/video device. In general, device 12 would include an operable portion (not shown), i.e., the part of the device that provides the device's function, a fuel cell (not shown) to provide portable power to the device and the interconnect 20 all housed within the housing 11.

Figure 2A:
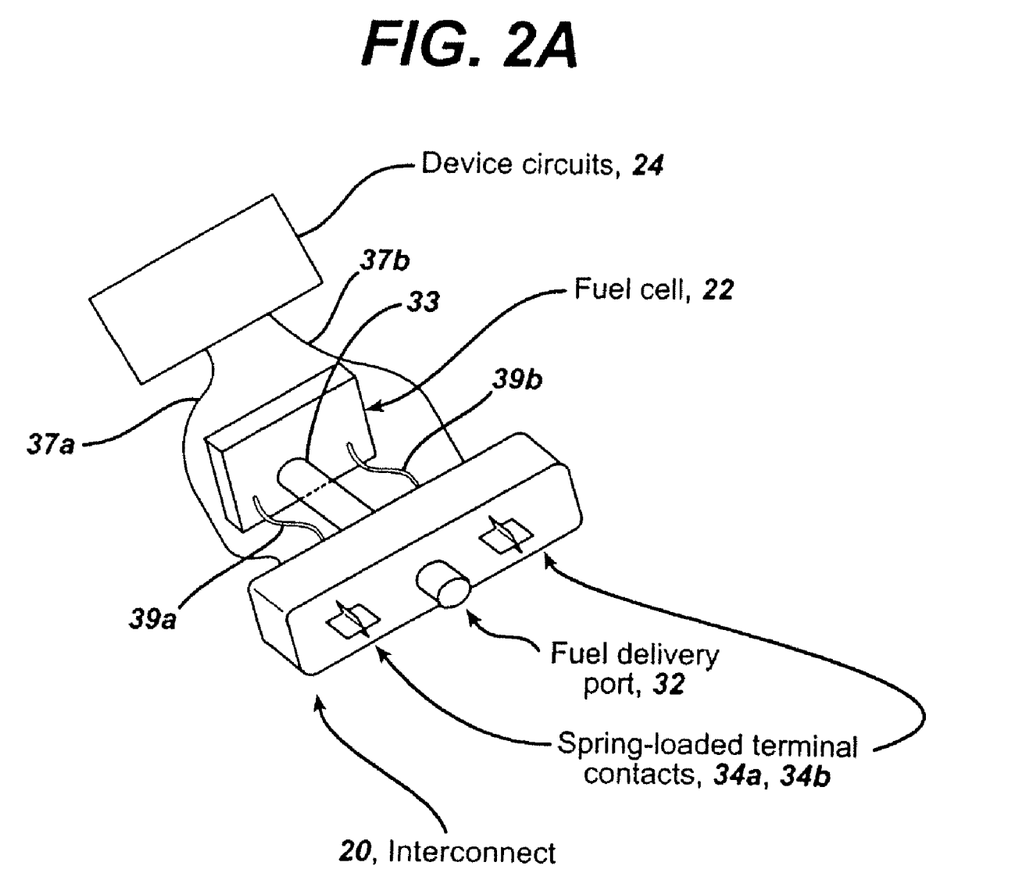
FIGS. 2A and 2B are perspective diagrammatical views of an interconnect structure for coupling to a fuel cell and device electronics.

Referring to FIG. 2A, interconnect 20 provides an interface between a fuel cell 22 and a fuel cartridge or battery (not shown). The interface 20 has appropriate mating fittings 32 to allow a fuel cartridge (not shown) to connect to the interface 20 and deliver fuel to the fuel cell 22 disposed in the device 12. The mating fitting 32 provides an ingress fuel interface port. The interface port 32 can be a simple valve or merely an ingress port or other configuration enabling passage of a liquid or gas fuel and allow secure, leak-proof mating with a complementary port on a fuel cartridge. The mating fitting 32 allows liquid or gas fuel to flow into the fuel cell 22, via an egress port 33 to enable operation of the fuel cell. The interface 20 also includes a pair of spring-loaded battery terminal contacts 34a, 34b disposed on a common surface of the interconnect 20 to allow for contact with battery terminals in a prismatic battery system. The fuel cell 22 receives fuel from the fuel cartridge that is connected to the interconnect 20. The fuel cell converts the fuel into electrical energy that is used to power electronic circuits 24 that provide the operational functionality for the device 12. The electronic circuits 24 can also be powered by a battery that is connected to the interconnect 20.

Figure 2B:
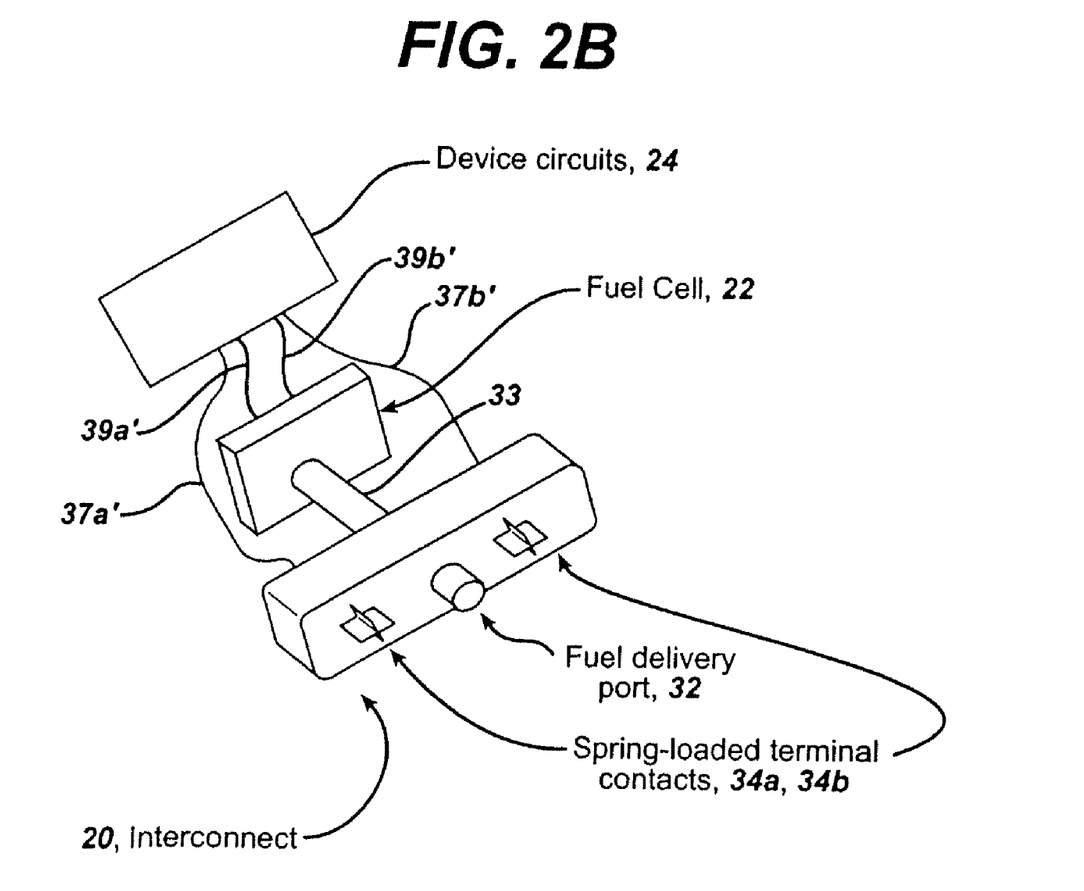
Figure 5:
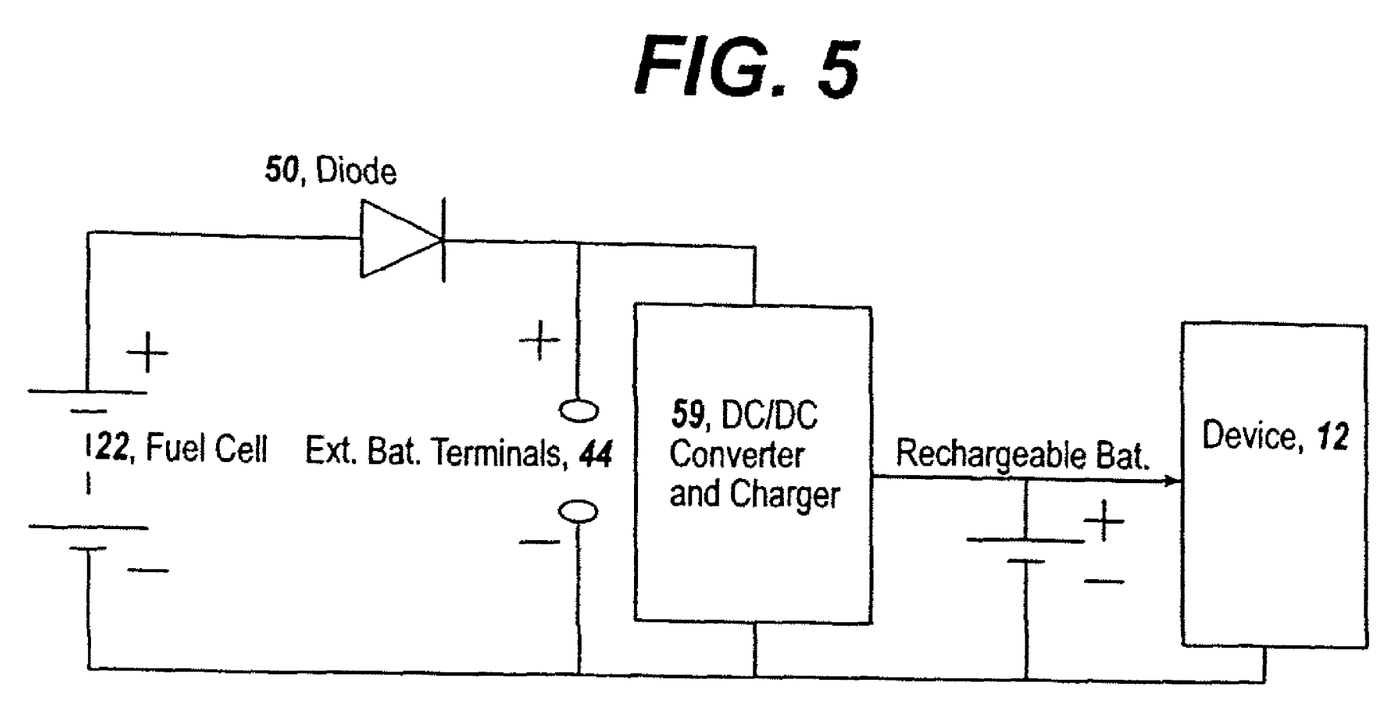
FIGS. 5 and 6 are schematic diagrams of electronic circuits for a fuel cell based hybrid DC power supply.
Figure 6:
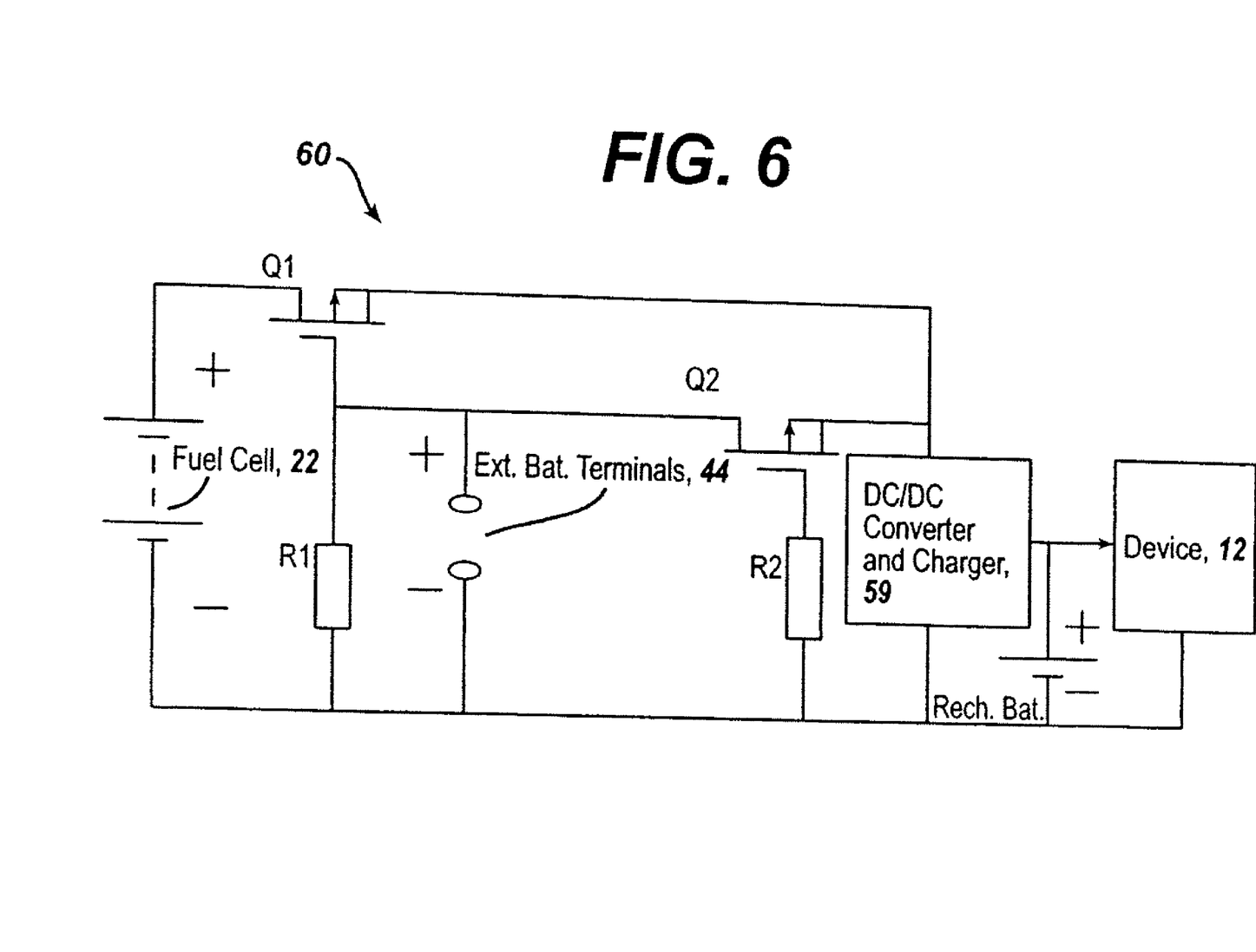

In one implementation as shown in FIG. 2A, electrical energy is delivered via electrical connections 37a, 37b that emanate from the interconnect 20. The fuel cell 22 has electrical connections 39a, 39b that couple to the interconnect 20. Circuits that switch between the battery and fuel cell supplied power to place power on the connections 37a, 37b are provided in FIGS. 5 and 6. In another implementation as shown in FIG. 2B, electrical energy from the battery is delivered via electrical connections 37a', 37b' that emanate from the interconnect 20 and the fuel cell 22 has electrical connections 39a', 39b' that couple to the device circuits 24. In this arrangement, the circuits that switch between the battery and fuel cell supplied power as described in FIGS. 5 and 6 are thus disposed on the device circuits 24.

Although the interconnect 20 is illustrated as possessing an ingress port 32 that protrudes out from the interconnect 20, it is to be understood that the ingress port could be an aperture that receives an egress port that protrudes out of the fuel cartridge.

Figure 3:
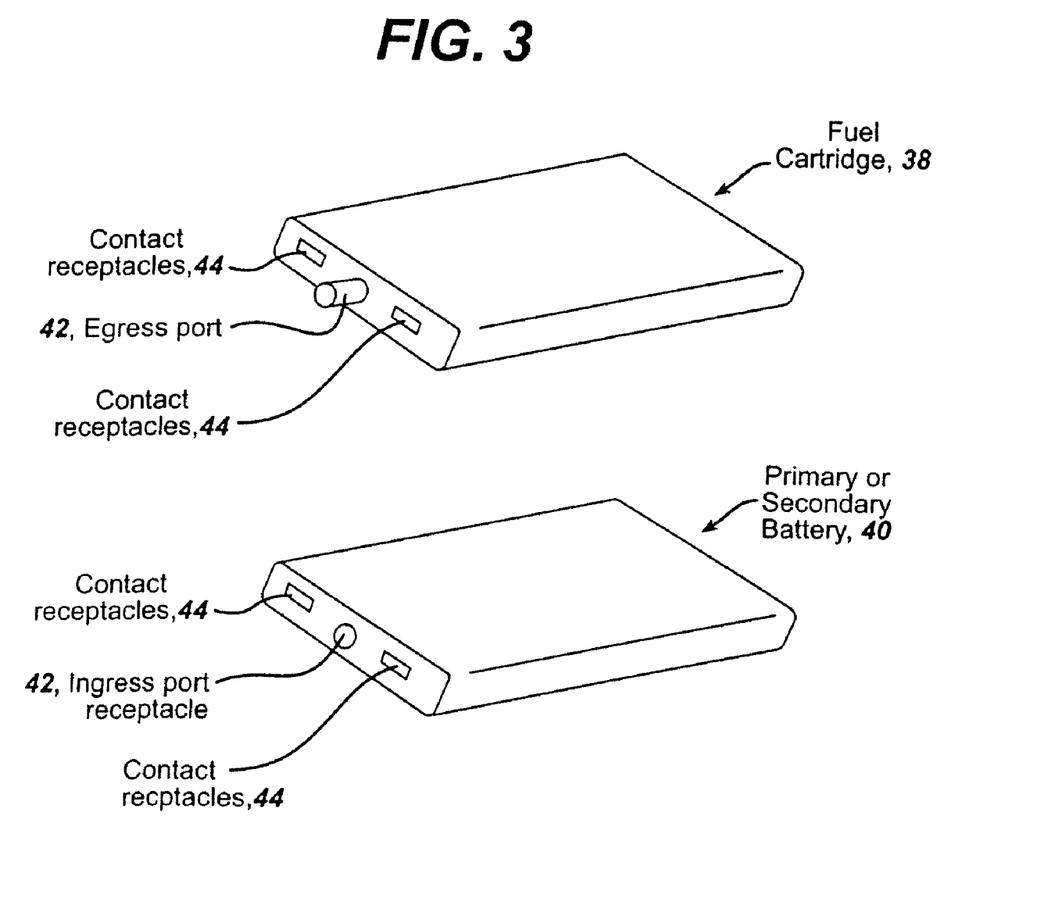
FIGS. 3 and 4 are perspective, diagrammatical views depicting exemplary arrangements for batteries and fuel cartridges.

Referring to FIG. 3, a fuel cartridge 38 and a prismatic battery 40 are shown. The fuel cartridge 38 has a fuel delivery interface, complementary to the interface 20 (FIG. 2), including an egress port 42, as shown. The prismatic primary or secondary battery 40 has a pair of battery terminals 44 (contact receptacles) on the same side of the prismatic package, as also shown.

In addition, the battery can include a void to accept the ingress port on the interface 20 (FIG. 2) and the fuel cartridge can have a pair of battery terminals 44 (contact receptacles) on the same side of the prismatic package, as also shown. The pair of battery terminals 44 (contact receptacles) on the prismatic package are not electrically active, and in some embodiments can be short circuited to be used with an appropriate circuit to indicate that a fuel cartridge has been connected to the interconnect 20. The arrangements shown in FIG. 3 enable the interface 20 to receive either the fuel cell cartridge 38 or battery 40 so that both the fuel cartridge's fuel delivery valve mechanism, and the battery's terminals mate with their corresponding interconnect components on the interface 20 (FIG. 2).

Batteries envisioned to be compatible with the terminal contact scheme include prismatic primary lithium batteries from Duracell and other battery systems. Other battery configurations are potentially compatible with the battery terminal arrangement described above.

Figure 4:
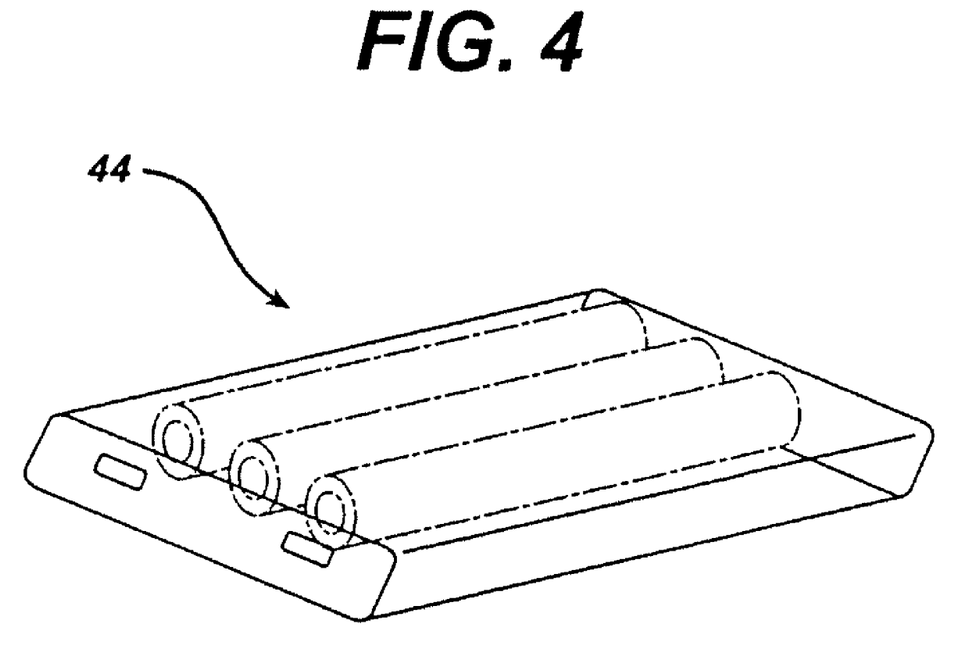

Referring to FIG. 4, a prismatic battery case 44 is shown that allows cylindrical batteries such as AA, AAA or AAAA sizes to be used as an alternative to a prismatic battery in mating with the interface 20. Such a case could be sold as an inexpensive accessory to a fuel cell-powered device, and allow consumers to purchase cylindrical batteries and insert them into the case to use as a backup cartridge. It would also connect the back terminal of a cylindrical battery to allow it to be accessed by one of the front terminals of the prismatic case. An example of one option is shown in FIG. 4, where three AAA batteries are contained within a prismatic case that allows their use with the interface 20.

An alternate configuration could be envisioned where primary or secondary cylindrical battery or batteries could be used. In the case of a single cylindrical battery, the battery terminals would need to be reconfigured to allow one to be placed on the cavity door to allow the battery to be appropriately connected to both terminals when fully inserted. In such a configuration, the fuel valve may need to serve as a battery terminal and be configured specifically to allow either simple electrical connection of the primary or secondary cylindrical battery or the connection of fuel delivery valve on the fuel cartridge. A dual configuration of cylindrical batteries could be achieved using the two battery terminals shown in FIG. 2 for one set of terminals, and a second set on the back of the cavity door which would close and provide contact for the back terminals on the cylindrical batteries.

The use of primary or secondary batteries in place of fuel for a fuel cell powered device provides a viable backup option for operation of the device. Other features of the fuel cartridge include a fuel cavity door. If the battery terminal prongs detect a battery, the detection can activate closure of a door to the fuel cartridge cavity in which the battery resides, e.g., FIG. 1. This could allow a more effective closure and improved appearance to the device in which the power source resides if the geometric design of the battery does not conform well to the fuel cartridge cavity.

A fuel delivery valve engagement mechanism (not shown) used in combination with the battery terminal prongs, upon detecting the absence of a battery (e.g., by not measuring any voltage across terminals) but detecting another signal on the location where the terminals would be located, could activate an engagement mechanism to enable a physical docking of the fuel valve system with the fuel cartridge. As an example, two small metal plates could be located on a fuel cartridge where the battery terminals would be in a prismatic battery or in the contact receptacles 44 in the fuel cartridge 38 (if used). These terminals could be short-circuited. If a circuit connected to the battery terminal prongs detects no voltage across the terminals but only a small resistance, the circuit could initiate a mechanism to mechanical dock the interface with an inserted fuel cartridge.

Referring to FIG. 5, a silicon diode 50 is shown coupled between a fuel cell 22 and external battery terminals that can receive a battery (not shown). The terminals can also receive a AC or DC adapter discussed below. When the fuel cell 22 is supplying the power, the diode 50 is forward biased, and the external battery 44 terminals are at open circuit. If an external battery is connected to the contacts 44 however, the diode 50 is reverse biased (the fuel cell voltage without fuel supply drops to lower than the battery voltage), and the battery supplies power to the device 12. The diode 50 prevents charging of the fuel cell 22 from the battery that would cause energy loss and possible damage to the fuel cell 22.

A dc-dc converter 59 is coupled between the output of the dc-dc converter 59 and the device 12. The dc-dc converter 59, which is a step-up (boost) DC/DC converter, and the rechargeable battery are used together to provide optimal operation for the fuel cell.

Referring to FIG. 6 a transistor-based switch circuit 60 is shown. An advantage of this arrangement is that fuel/battery selection is provided with virtually no energy loss (e.g. the voltage drop across the diode in FIG. 5). When the fuel cell cartridge (not shown) is inserted and the fuel cell 22 supplies the power, the external battery terminals 44 are open circuit, and the gate of the p-channel MOSFET Q1 is biased through R1 (e.g., a 1 meg. ohm resistance). In this case, Q1 is on and conducts from the fuel cell to the load (device electronics 24), and Q2 is off. If an external battery is inserted, the gate voltage of Q1 goes positive and turns the transistor off, preventing connection of the two power sources in parallel, and Q2 is biased through R2 (e.g., a 1 meg. ohm resistance) and conducts the battery power to the load. The dc-dc converter 59 is a step-up (boost) DC/DC converter to provide optimal operation for the fuel cell.

The circuits of FIG. 5 or 6 could be incorporated within the interface 20 or the portable device 12, which uses portable fuel cells. The specifics will be determined by the application, the size of the device and the volume available for the power source. However, it is possible that optimum implementations could involve multiple prismatic batteries or battery cases inserted in place of a larger volume fuel cartridge, or a cylindrical battery or batteries. The specific circuitry will also be determined by the application, and by the fuel cell system's voltage output vs. that of the battery replacements.

Figure 7:
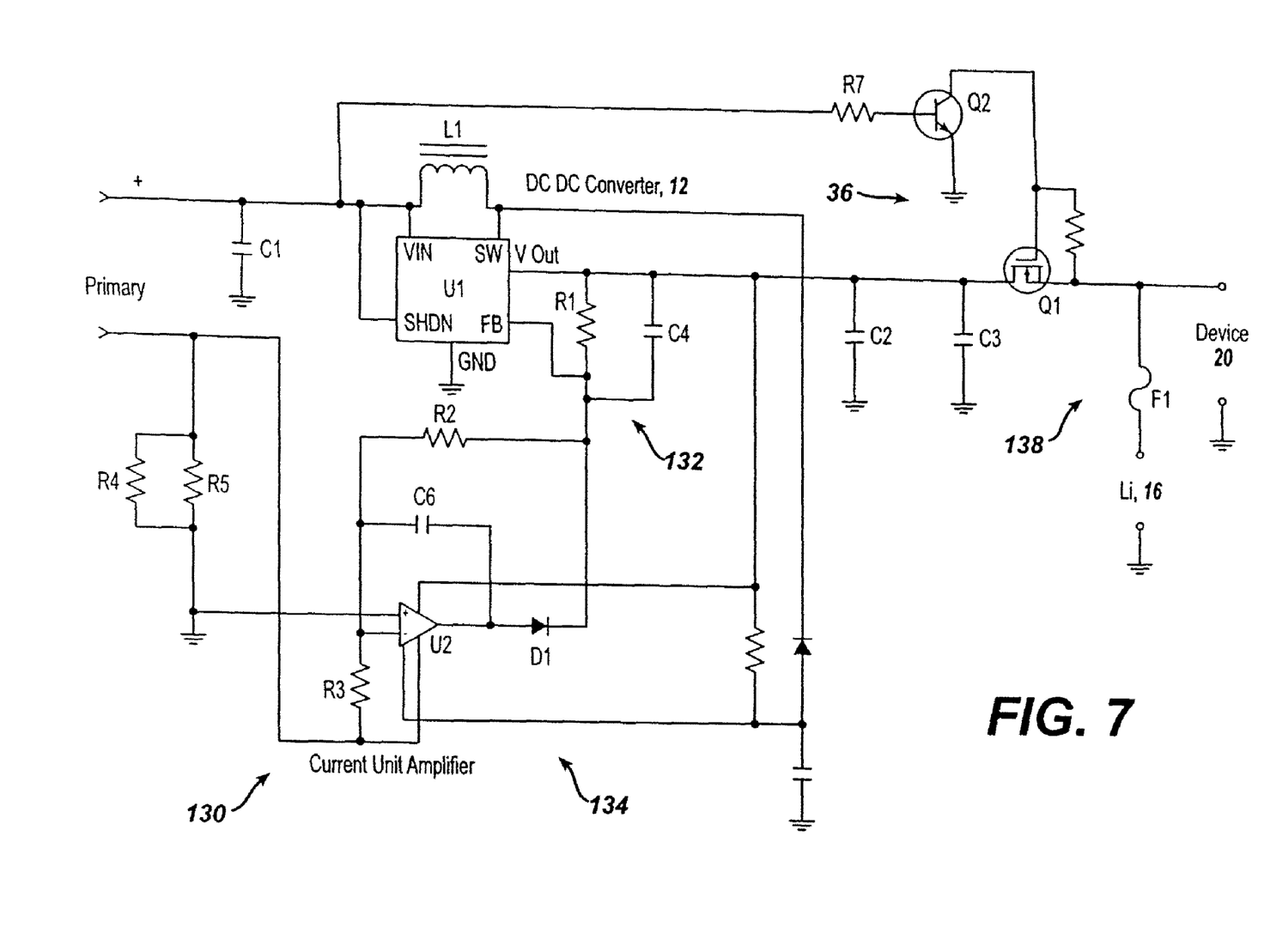
FIG. 7 is a schematic diagram of a control circuit for the hybrid DC power supply.

Referring to FIG. 7, a circuit 130 to control the operation of the step-up (boost) DC/DC converter 59 to provide optimal operation for the fuel cell is shown. The circuit 130 includes bias and control circuits 132 for the DC-DC converter 59, a primary current sense amplifier and a power shutdown 134 and a charge cutoff switch 136. In addition, fuse protection 138 is supplied. The circuit 130 is configured to draw a constant amount of current from the fuel cell such that the fuel cell can operate at its optimum operating point. In operation, the fuel cell delivers a constant current to the DC/DC converter 59. The DC/DC converter 59 delivers voltage to the rechargeable cell, which is either used to recharge the cell or delivery power to the load device.

The step-up (boost) DC/DC converter 59 can be for example, an LTC 3400 ($U_1$) from Linear Technology. Many other devices could be used for example, the MAX 1765 from Maxim. The LTC 3400 ($U_1$) has excellent efficiency (>90%) at low current levels, compared to about 80% or less for most other DC/DC converters. The biasing circuit 132 for the converter 59 includes an inductor $L_1$ (e.g., 6.8 uh) coupled across the converter 59, which is optimized to improve conversion efficiency. The input voltage range of the step-up (boost) DC/DC converter 59 in this example is from 0.7 to 5.5V. The output voltage is adjustable via two external resistors, $R_1$ and $R_2$. The output voltage is adjusted on the feedback input (FB) of the converter 59 to equal an internal voltage reference (e.g., 1.25V), when the output voltage is 4V on output (Vout). The output voltage should remain higher than the input voltage for the converter 59 to operate normally. The limit on output voltage level to 4.0 volts thus limits the input voltage range in this particular implementation to 0.7-3.3V, which is applicable for two to four fuel cells in series. Should the input voltage exceed the output with more than 0.7V, the body diode within the DC/DC converter device will be forward biased and current will be transferred from the primary side to the secondary, limited only by the internal resistance of both batteries and the voltage difference between the two systems, resulting in a high inrush current.

The internal output current limit for this converter is 600 mA. A lower current limit, in the range 20-400 mA, is desirable to further improve efficiency and reduce size and cost. Ideally, the circuit 130 could be an ASIC, incorporating most of the external components (probably except the inductor L1 and the current sensing resistor, which can be used to program externally the primary current for the specific application). The capacitors $C_1$, $C_2$ and $C_3$ are used to filter switching pulses at the input and output of the converter 59 and prevent oscillations. C4 is used for "soft start" of the converter and to improve stability.

The circuit 130 has primary current sensor/amplifier with power shutdown section 134 including an operational amplifier U2 having resistors $R_4$ and $R_5$ to provide a primary current sensing resistor. The value of resistors $R_4$ and $R_5$ is a very low value to provide a minimum voltage drop or (IR losses) across the resistor $R_5$ (e.g., 0.25 ohm at 100 mA). The very low (25 mV average) IR drop is amplified 50 times by the operational amplifier $U_2$, whose gain is set by the $R_2/R_3$ ratio to reach 1.25V at the output of a diode D1, connected to the converter 59 feedback input FB. In this way, the output voltage signal across R1, and the input current signal, coming through the diode D1, are summed at the converter's feedback input, without interference in-between, on a "largest-only" basis, and compared to the internal reference voltage. Capacitor $C_6$ is coupled between the output of U2 and a junction between $R_2/R_3$. The system reacts to whichever of the signals first reaches 1.25V, and stops the converter switching, thus reducing the output voltage. This provides a simultaneous constant output voltage/constant input current type of battery charging source.

The output voltage is limited to 4V, and the output current is also limited to: $I_{out}=I_{in} \times V_{in}/V_{out}$, which turns this voltage converter into a Li-ion charger, where CV/CC (constant voltage/constant current) output is required. Usually the Li-ion chemistry requires V=4.1V or 4.2V, and I<1C rate. In hybrid power supply, V=4V and I<<1C rate, which is much safer and may not require an additional protection board. If abnormal conditions are anticipated, redundant protections should be used. For example, applying higher voltage, e.g., more than 3.3V loaded, or more than 4.3V open circuit voltage, at the fuel cell terminals may be unsafe for the system described above.

As the operational amplifier $U_2$ drains a few tens of microamps, when powered, a power-save shutdown mechanism is implemented in order to reduce the quiescent current of the system, using the shutdown pin of the operational amplifier $U_2$. When the converter 59 is active and switching, the pulses through the diode $D_2$ will decrease the voltage on the shutdown pin of the operational amplifier $U_2$ sufficiently to enable the operational amplifier U2, and when idle, current through the pull-up resistor $R_8$ will charge the capacitor C5 and cut-off power to the operational amplifier U2.

The circuit 130 also includes a switch circuit 136. The Li-ion cell is connected to the output of the DC/DC converter 59 through the MOSFET (metal oxide semiconductor field effect transistor) switch $Q_1$. The switch circuit 136 prevents discharge (several milliamps) of the Li-ion cell through the output of the DC/DC converter 59, when the fuel cell during discharge reaches the cutoff voltage on the DC/DC converter 59 input side. The switch circuit 136 could also be used to tune the system primary cutoff voltage to a desired level for 2 to 4 fuel cells in series of the selected type. The charge switch circuit 136 cuts off before the converter 59 input cutoff voltage is reached. The example shown is for two to four methanol fuel cells stack implementation. MOSFET Q1 is biased through the emitter-collector junction of the bipolar transistor $Q_2$, and the base-emitter junction of the last is biased through $R_7$ from the fuel cell. When the primary voltage drops under about 0.7V, $Q_2$ is off and turns off $Q_1$, stopping the charge. The resistor $R_6$ sinks the leakage current through $Q_2$ when open to prevent it from biasing the high-impedance gate of $Q_2$. As turning the charge "off" removes the load from the converter output Vout and hence from the fuel cell, the voltage of the last increases and charging resumes, then the circuit 136 is activated again, thus switching until all available energy of the fuel cell for the chosen cutoff voltage is transferred to the rechargeable battery 16. This approach distinguishes from other approaches, as normally a device will cut off when the cutoff voltage of its power source is reached for the first time, and some amount of energy will remain unused in the fuel cell. The current approach allows the fuel cell to deliver all of its energy prior to termination. The Li-ion battery has a fuse circuit 138 with fuse ($F_1$) in series with both the charge path and the output, used for safety, to permanently open in case of a short-circuit condition.

There are several parameters to optimize when designing a hybrid power system. For example, the energy of the fuel cell 12 is optimized to cover the desired total runtime of the device. The energy of the rechargeable battery 16 is optimized to cover the desired continuous runtime of the device for 1 cycle. The power of the rechargeable cell is selected to be adequate for the device peak power and the charge rate is optimized to allow nearly full fuel cell use to satisfy a desired intermittent performance of the device.

In many devices 20, a smaller than originally specified size Li-ion battery can provide the necessary peak power, and due to the permanent charging, may be sufficient for satisfactory continuous performance.

The charging technique described is based on a voltage boost converter that works when the input voltage is lower than the output voltage. The internal switching transistor (in the DC/DC converter) has a diode that is forward biased and starts conducting directly from input to output (without current limit), if the input voltage exceeds with about 0.2-0.4V the output voltage. The Li-ion rechargeable cell has a typical discharge voltage range from 4.2V down to 3.2V. A protection circuit, cutting off at 2.4V is incorporated in the battery to prevent degradation of the Li-ion cell. The circuit is configured such that the load (device) cuts off at 3.2 V, and the input load voltage will never exceed 3.3V (2 to 4 fuel cells in series).

It is possible to design a hybrid power supply using higher input than output voltage by replacing the step-up (boost) converter with a step-down (buck) DC/DC converter. This is less desirable because multiple cells in series have lower energy density than one or two large cells with the same volume. Cell voltage balancing can be a problem with the multiple cells in series and could be more difficult and expensive to refuel. For fuel cell applications, 8-20 cells would be needed for the step-down variation.

Figure 8:
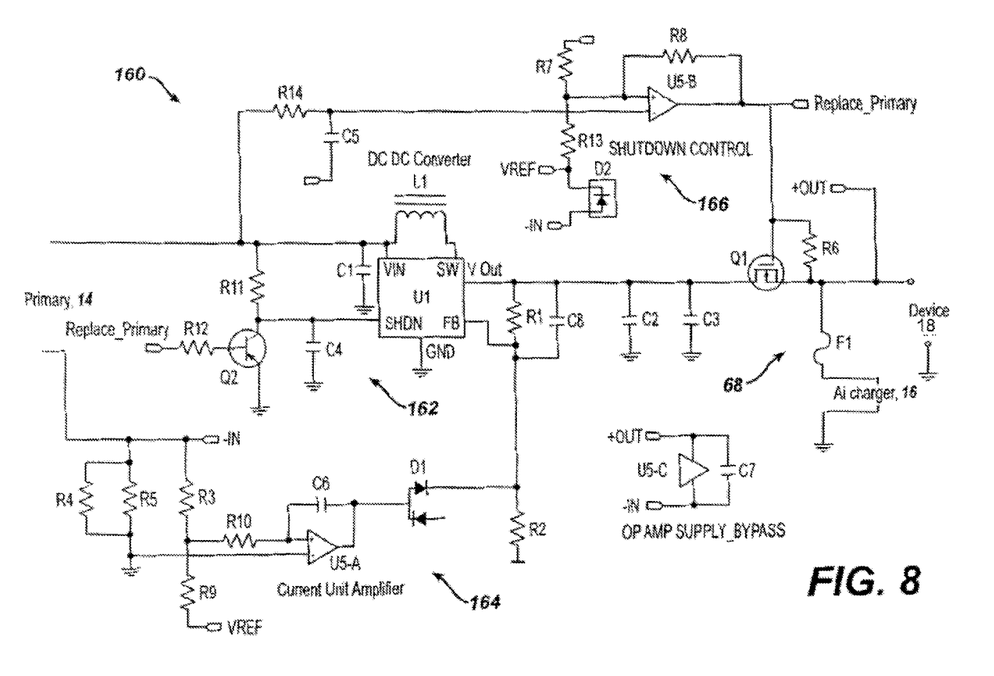
FIG. 8 is a schematic diagram of an alternate control circuit for the hybrid DC power supply.

Referring to FIG. 8, an arrangement of step-up (boost) DC/DC converter is shown. The circuit 160 includes bias and control circuits for the DC-DC converter, a primary current sense comparator 164 and a charge cutoff comparator 166, connected to a power shutdown circuit 162. In addition, fuse protection 168 is supplied. The circuit 160 is configured to draw a constant amount of current from the fuel cell such that the fuel cell can operate at its optimum operating point. In operation, the fuel cell delivers a constant current to the DC/DC converter 59. The output of the DC/DC converter 59 is connected to the rechargeable cell, which is either used to recharge the cell or deliver power to the load device 18.

The step-up (boost) DC/DC converter 59 can be for example, the LTC 3400 ($U_1$) from Linear Technology. Many other devices could be used, for example, the MAX 1765 from Maxim, as mentioned above. The external components for the converter 59 include an inductor $L_1$ (e.g. 6.8 uh) coupled across the converter 59, which is selected for optimal conversion efficiency. The input voltage range of the step-up (boost) DC/DC converter 59 in this example is from 0.7 to 5.5V. The output voltage is adjustable via two external resistors, $R_1$ and $R_2$. The output voltage is adjusted on the feedback input (FB) of the converter 59 to equal an internal voltage reference (e.g., 1.25V), when the output voltage is 4.0V on output (Vout). The output voltage should remain higher than the input voltage for the converter 59 to operate normally. The minimum output voltage of 3.2 volts thus limits the input voltage range in this particular implementation to 0.7-3.3V, which is applicable for two to four fuel cells in series. Should the input voltage exceed the output, current will be transferred directly from the primary side to the secondary, limited only by the internal resistance of the fuel cells and the Li-ion battery, resulting in a high inrush current.

As above, a lower internal output current limit of the DC/DC converter 59, in the range 20-400 mA, is desirable to further improve efficiency, and reduce size and cost. This could be provided by an ASIC, incorporating most external components (probably except the inductor L1 and the current sensing resistor, which can be used to program the primary current value for the specific application). The capacitors $C_1$, $C_2$ and $C_3$ are used to filter the switching pulses at the input and output of the converter, and prevent oscillation. The capacitor $C_8$ is used to assure "soft start" of the DC/DC converter.

The circuit 164 includes a primary current sensor/comparator, and power shutdown section 162, including an operational amplifier U5-A (one operational amplifier of a dual packaged op amp pair), having resistors $R_4$ and $R_5$ to provide a primary current sensing resistor, which should have a very low value for minimum voltage drop (or IR losses) across the resistor $R_5$ (e.g., 0.25 ohm at 100 mA). The very low (25 mV average) IR drop is compared to a reference voltage (produced by the reference voltage source D2 and the voltage divider $R_9/R_3$) by the operational amplifier $U_2$, whose output will go high and cut off the converter, when the primary current exceeds the preset limit. The resistor $R_{10}$ and the capacitor $C_6$ connected in the negative feedback loop of the operational amplifier U5-A, form an integrator to introduce a delay and thus stabilize the comparator's response. The diode D1 prevents interference between the voltage control and the current control circuits. In this way, the output voltage signal, coming through $R_{11}$, and the input current signal, coming through the diode D1, are summed at the converter's feedback input, without interference in-between, on a "largest-only" basis, and compared to the internal reference voltage. The system reacts to whichever of the signals first reaches 1.25V, and stops the converter 59 switching, thus reducing the output voltage.

The Li-ion cell is connected to the output of the DC/DC converter 59 through the MOSFET (metal oxide semiconductor field effect transistor) switch $Q_1$ having a shunt mounted resistor $R_6$, as shown. The shutdown control circuit 166 prevents discharge (several milliamps) of the Li-ion cell through the output of the DC/DC converter 59, when the fuel cell during discharge reaches the cutoff voltage on the DC/DC converter input side (in this example 1.4V for four to six fuel cells in series). It could also be used to tune the system primary cutoff voltage to a desired level for the selected fuel cell type. The shutdown circuit 166 via $Q_1$ cuts off before the converter input cutoff voltage is reached. MOSFET $Q_1$ is biased through the output of an Op Amp U5-B that is used as a comparator to sense, via resistor $R_{14}$, having a shunting capacitor $C_5$ when the input voltage to the DC-DC converter 59 is below a certain threshold. The threshold voltage is determined by resistors $R_7$, $R_3$, and Zener diode D2. In this example, hysteresis is introduced by the use of $R_8$ in the U5-B negative feedback loop. If V is 1.40 volts or less, the converter is shut down through the inverter circuit 162, formed by the transistor $Q_2$ having bias resistors $R_{11}$ and $R_{12}$ with a shunting capacitor $C_4$, and the charge is cut off via $Q_1$, preventing discharge of the Li-ion cell through the converter output. If V is 1.45 volts or more, the DC/DC converter is "on" and the circuit is charging. A signal "Replace fuel cartridge" is asserted when the input voltage is below 1.4V and is used to drive $Q_1$ and $Q_2$. When the primary voltage drops under about 1.4V, $Q_2$ is off and turns off $U_1$, stopping the charge. The resistor $R_6$ sinks the leakage current at the high-impedance gate of $Q_1$, when open, to prevent biasing. Turning the charge "off" removes the load from the converter output $V_{out}$ and hence from the fuel cell, and the voltage of the fuel cell recovers, turning the charge "on" again. The switching and hence charge will continue at attenuated duty cycle until all available energy of the fuel cell for the chosen cutoff voltage is transferred, as above. U5-C is provided with a bypass capacitor $C_7$.

The Li-ion battery 16 has a fuse circuit 168 with fuse ($F_1$) in series with both the charge path and the output, used for safety, to permanently open in case of a short-circuit condition.

Pulsed charging at deep discharge, and a voltage pulsing which allows anode catalyst re-activation, would both contribute to further expanding the advantage for the hybrid power supply 10 configuration vs. the fuel cell only power source.

Figure 9:
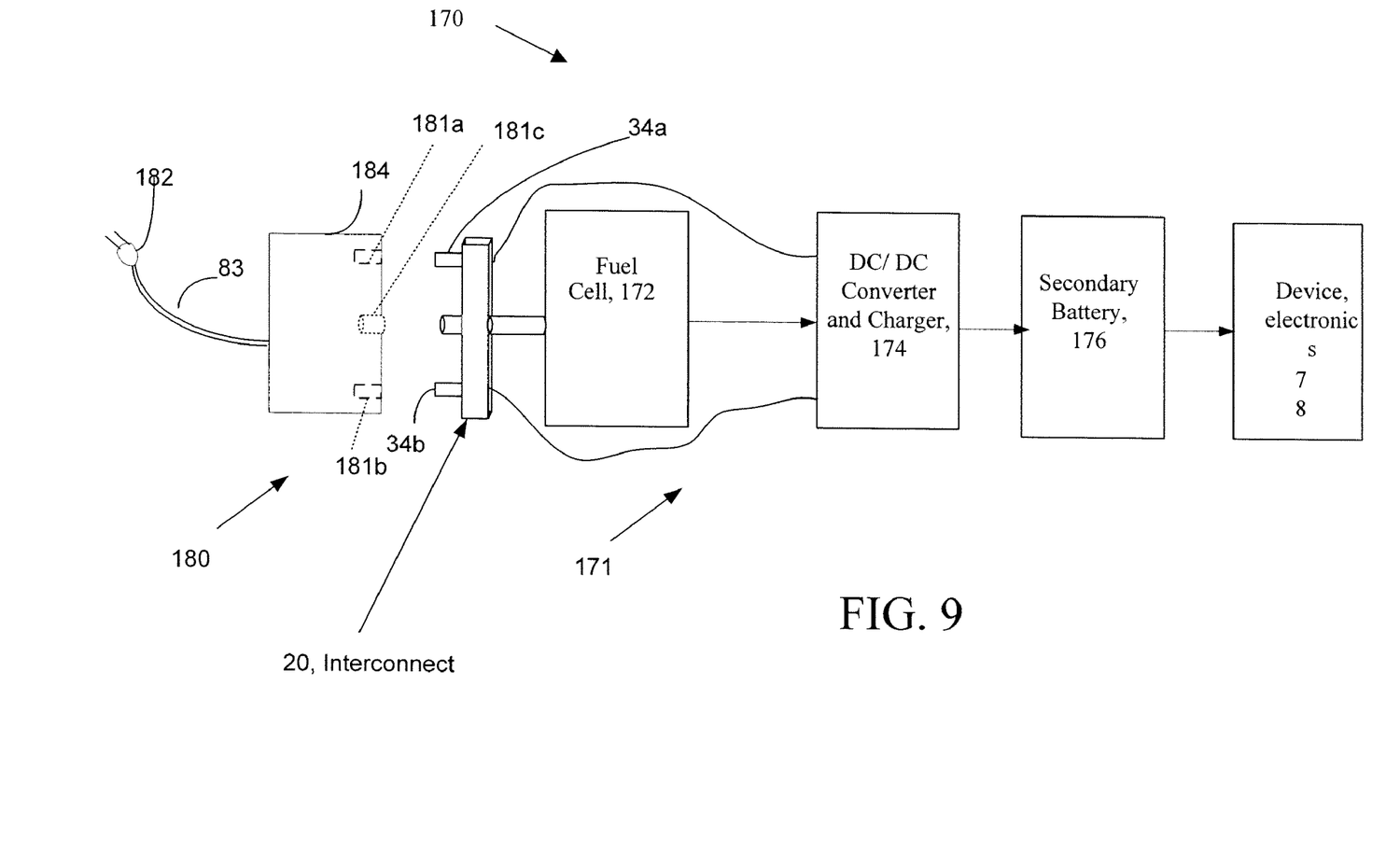
FIG. 9 is a block diagram of a fuel cell based hybrid DC power supply with external AC power charger.

Referring now to FIG. 9, a portable electronic device 170 that includes a hybrid power supply 171 (as for instance in FIGS. 5-8) is shown. The hybrid power supply 171 includes a switching type DC/DC boost type converter 174 that receives energy from a primary cell 172 and delivers the energy to a secondary, e.g., rechargeable cell 176. In one embodiment the primary cell 172 is a fuel cell and has a fuel cartridge (not shown) that supplies a source of fuel (a form of hydrogen) to the fuel cell 172.

The rechargeable cell 176 delivers power, as needed, to the device 178. The device 178 can be any type of electronic device, especially a portable device such as a wireless device, e.g., a cell phone, personal digital assistant, digital camera, and so forth. The switching type DC/DC boost type converter 172 is configured to provide a fixed output voltage that is less than the charging voltage of the rechargeable cell 176, and is current limited to a portion of the charging current of the rechargeable cell. In this configuration, the switching type DC/DC boost type converter 172 acts also as a charger for the rechargeable cell 176. The rechargeable cell 176 can be a rechargeable Li-Ion type. Preferred examples include a Li-Ion or Li-Polymer rechargeable cell. These rechargeable cells can provide power to a device 178 for relatively long periods of time compared to other potential rechargeable cells, and can be effective over long periods of continuous use.

Primary power sources 172 may include, but are not limited to alkaline, zinc-air, and fuel cells. In this arrangement the primary sources are used as backup for when a fuel cartridge is not available. Another embodiment includes an AC adapter 180 that connects to the interconnect 20.

The external AC/DC adapter arrangement 180 can plug into an AC outlet or can plug into a car cigarette lighter. As shown, the adapter 180 includes a plug 182 connected to an integrated interconnect/charger adapter 184 via a pair of wires 183. Integrated interconnect/charger adapter 184 connects directly to the interconnect 20 and includes battery terminals 181a, 181b to connect to terminals 34a, 34b and an aperture 181c that receives the end of the ingress port 32 of the interconnect 20. Integrated interconnect/charger adapter 184 also includes necessary electronics (not shown) that converts AC voltage to a proper rated output. DC voltage at terminals 181a, 181b and thus delivers DC power to the external battery terminals 34a, 34b of the interconnect 20. This power is used to charge the rechargeable battery of the hybrid system embedded in the device 78.

Figure 10:
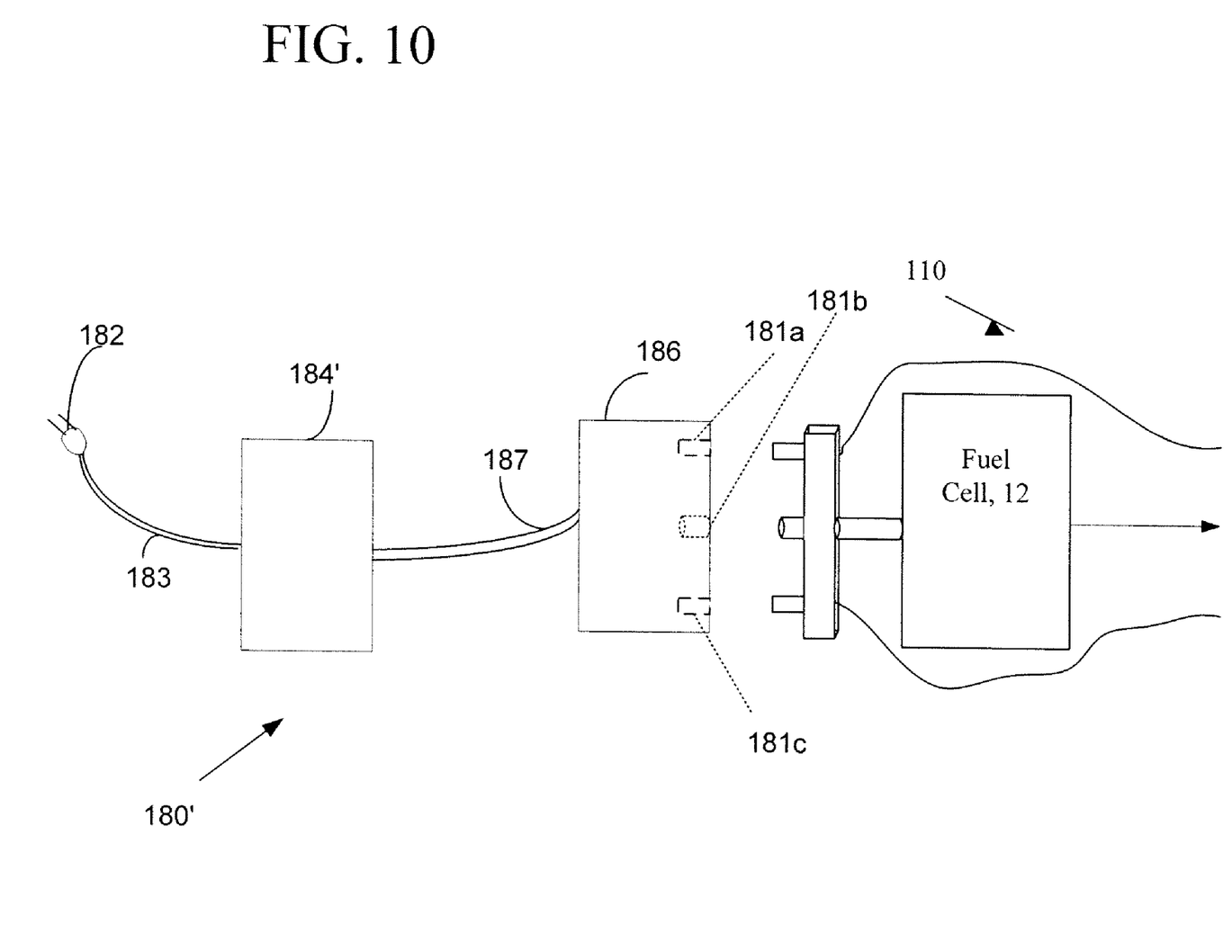
FIG. 10 is a block diagram of a fuel cell based hybrid DC power supply with an alternate external AC power charger arrangement.

Referring to FIG. 10, the adapter electronics can be incorporated into a separate unit 184', as illustrated that is connected to the plug 182 via a pair of wires 183 and which delivers the power over a second pair of wires 187 that are connected to a device adapter 186. Device adapter 186 is connected to the interfaces 20, as shown. This arrangement may be preferred where heat generated by the adapter 184 (FIG. 9) would be undesirable in the device or if space constraints don't permit the inclusion of the integrated adapter/converter 184 (FIG. 9), thus separating the functions of adapting to the interconnect 20 using adapter 186 and converting voltages to the unit 184'.

Also the plug and the adapter 184 or 184' can be configured and designed to convert DC power to a proper output DC power level. Alternatively, in some DC arrangements no conversion to a lower or higher voltage is needed since the arrangements of FIGS. 5-8 could be used. In this way, when an AC or car battery power is available, the cost of a fuel cartridge or batteries could be saved. The external adapter does not need to provide the maximum device power, just low-rate charging power similar to the external battery.

Wire pairs can be power cords that are permanently affixed to their respectively connected bodies or can be connected via appropriate plugs, or connectors (not shown)

A number of embodiments of the invention have been described. Nevertheless, it will be understood that various modifications may be made without departing from the spirit and scope of the invention. For example, the circuit of FIG. 5 or FIG. 6 while described as being within the interconnect 20 could be located outside of the interconnect as a stand-alone circuit or as part of the electronic circuits that provide the operational functionality of the device. Accordingly, other embodiments are within the scope of the following claims.

What is claimed is:

1. A hybrid power supply comprises:
an interface to receive at separate times either a fuel cartridge to couple to a fuel cell system or a battery;
a fuel cell; and
a switching type DC/DC boost type converter coupled to the interface, the DC/DC boost type converter configured to receive energy from the fuel cell or from an external battery connected to the interface, with the switching type DC/DC converter configured to deliver the energy to a rechargeable cell, with the DC/DC converter further configured to provide substantially constant current drain from the fuel cell.

2. The hybrid power supply of claim 1, further comprising:
a circuit disposed to sense when a voltage is present across terminals of the interface to cause power to be supplied to the rechargeable battery from an external battery when the external battery is connected to the interface or from a fuel cell when the external battery is not connected to the interface and a source of fuel for the fuel cell is connected to the interface.

3. The hybrid power supply of claim 2 wherein the circuit includes a diode coupled between an output terminal of the fuel cell and a terminal of the interconnect that connects an external battery to the hybrid supply.

4. The hybrid power supply of claim 2 the circuit includes:
a first transistor having a gate, drain and source, the first transistor biased through a resistor to conduct power from the fuel cell to a load; and
a second transistor arranged where if an external battery is inserted, a gate voltage of the first transistor turns the first transistor off, preventing connection of the fuel cell to the battery through the drain and source of the first transistor, and the second transistor is biased through a second resistor to conduct power from the battery to the load.

5. The hybrid power supply of claim 2, further comprising:
a circuit including a fuel cell current control that senses fuel cell current, and controls in part operation of the converter to provide constant current discharge on the fuel cell side of the hybrid power supply.

6. The hybrid power supply of claim 1 wherein the interface includes:
a pair of mating fittings disposed on the common surface of the interface to allow a battery or to a source of fuel for a fuel cell to connect to the interface through the same pair of mating fittings.

7. The hybrid power supply of claim 1 wherein the interface includes:
a pair of mating fittings disposed on the common surface of the interface; and
a port disposed between the pair of mating fittings to allow a battery or to a fuel cartridge for a fuel cell to connect to the interface through the same pair of mating fittings and allow fuel to flow to a fuel cell through the port.

8. The hybrid power supply of claim 1, further comprising:
a diode coupled between the fuel cell and an external battery terminal of the interconnect such that when the fuel cell supplies the power, the diode is forward biased, and the external battery terminals are at open circuit and if an external battery is connected to the mating fittings the diode is reverse biased, and the battery supplies power to the load.

9. A hybrid power supply comprises:
a fuel cell;
an interface to receive either a fuel cartridge for a fuel cell or external battery; and
a switching type DC/DC boost type converter that receives energy from the fuel cell or an external battery connected to the interface and, the switching type DC/DC boost type converter is arranged to deliver the energy to a rechargeable cell; and
a circuit including a current sensor/comparator, disposed in a feedback control loop about the DC/DC converter to sense current from the fuel cell, and in which the circuit controls in part operation of the converter to provide constant current discharge on the fuel cell.

10. The hybrid power supply of claim 9 wherein the current sensor/comparator draws a constant current that is about equal to an optimal level of current to draw from the fuel cell to maximize fuel efficiency.

11. The hybrid power supply of claim 9 wherein the hybrid power supply is configured so that the fuel cell provides a power level that is just above expected average power consumption for a particular device that the hybrid supply is coupled to application, and the rechargeable battery provides a power level that to peak power requirements of the particular device.

12. The hybrid power supply of claim 9 wherein the rechargeable cell is Li-Ion or Li-Polymer rechargeable cell.

13. The hybrid power supply of claim 9 wherein the circuit delivers an output voltage that corresponds to about 90% charge of the rechargeable cell.

14. The hybrid power supply of claim 9 wherein when neither the fuel source nor the external battery is present on the interface, power is delivered to a load from the rechargeable battery.

15. The hybrid power supply of claim 9 wherein the interface includes:
a pair of mating fittings disposed on the common surface of the interface to allow a battery or to a fuel cartridge for a fuel cell to connect to the interface through the same pair of mating fittings.

16. The hybrid power supply of claim 9 wherein the interface includes:
a pair of mating fittings disposed on the common surface of the interface; and
a port disposed between the pair of mating fittings to allow a battery or to a fuel cartridge for a fuel cell to connect to the interface through the same pair of mating fittings and allow fuel to flow to a fuel cell through the port.

17. The hybrid power supply of claim 9 further comprising:
a circuit disposed to sense when a voltage is present across terminals of the interface to cause power to be supplied to the rechargeable battery from an external battery when the external battery is connected to the interface or from a fuel cell when the external battery is not connected to the interface and a source of fuel for the fuel cell is connected to the interface.

18. A hybrid power supply comprises:
a fuel cell;
an interconnect configured to receive a fuel cartridge, a battery, or a power adapter at separate times;
a rechargeable cell;
a DC/DC boost type converter that receives energy from the fuel cell, battery or adapter, and is arranged to deliver the energy to the rechargeable cell with the DC/DC boost type converter configured to deliver the energy to the rechargeable cell and provide substantially constant current drain from the fuel cell.

19. The hybrid power supply of claim 18 further comprising:
a diode coupled between the fuel cell and an external battery terminal of the interconnect that receives a battery or the power adapter, such that when the fuel cell supplies the power, the diode is forward biased, and the external battery terminals are at open circuit and if an external battery or power adapter is connected to contacts on the interface the diode is reverse biased, and the battery supplies power to the load.

20. The hybrid power supply of claim 19 wherein the diode prevents charging of the fuel cell from the battery or power adapter.

21. The hybrid power supply of claim 19 wherein the DC-DC converter is coupled across the external battery terminals.

22. The hybrid power supply of claim 19 wherein the DC-DC converter is a step-up (boost) DC/DC converter to provide optimal operation for the fuel cell.

23. The hybrid power supply of claim 18, further comprising:
   a first transistor biased through a resistor to conduct power from the fuel cell to a load; and
   a second transistor arranged where if an external battery is inserted, the gate voltage of the first transistor turns the transistor off, preventing connection of the fuel cell to the battery, and the second transistor is biased through a second resistor to conduct power from the battery to the load.

24. The hybrid power supply of claim 18 wherein the interface includes a pair of mating fittings disposed on the common surface of the interface to allow a battery or to a source of fuel for a fuel cell to connect to the interface through the same pair of mating fittings.

25. The hybrid power supply of claim 18 wherein the interface includes a port disposed between a pair of mating fittings disposed on the common surface of the interface to allow a battery or to a source of fuel for a fuel cell to connect to the interface through the same pair of mating fittings and allow fuel to flow to a fuel cell through the port.

* * * * *